Oct. 24, 1961 O. F. ARTHUR 3,005,610
PALLETS FOR HANDLING MATERIAL

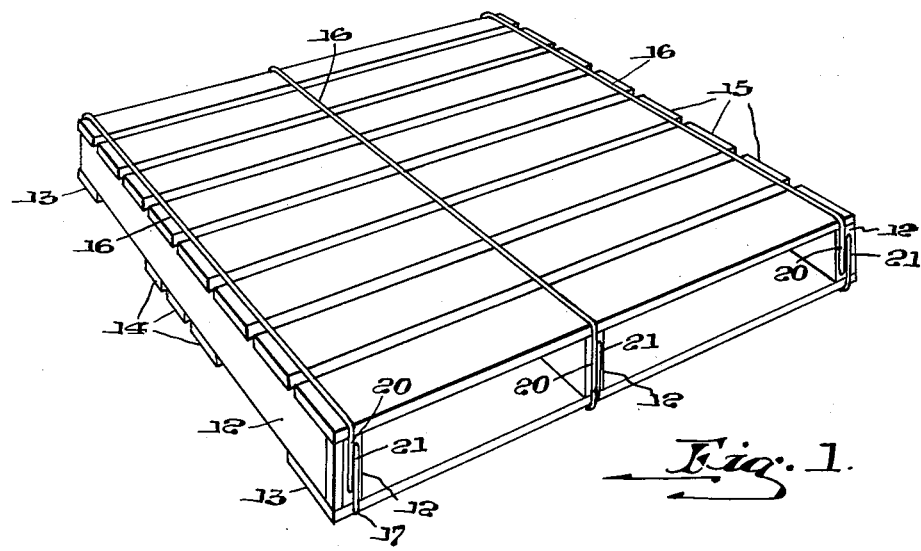

Filed Jan. 25, 1960 2 Sheets-Sheet 2

INVENTOR.
OSCAR F. ARTHUR.
BY Archworth Martin
his ATTORNEY

United States Patent Office 3,005,610
Patented Oct. 24, 1961

3,005,610
PALLETS FOR HANDLING MATERIAL
Oscar F. Arthur, Silver Spring, Md., assignor to Flow Products, Inc., Washington, D.C., a corporation of the District of Columbia
Filed Jan. 25, 1960, Ser. No. 4,462
4 Claims. (Cl. 248—120)

My invention relates to pallets, and more particularly to pallets of the type by means of which articles are supported for transport or storage, the pallets being usually handled through the use of fork-lift trucks. The application is a continuation in part of my application Ser. No. 816,495, filed May 28, 1959.

One object of this invention is to provide a pallet of such form and made in such manner that it will have greater strength and life than those forms of pallets wherein wooden deck boards are nailed or bolted to stringers.

Another object of my invention is to provide a pallet that may suitably comprise deck boards, stringers and bottom boards of wood, with an improved manner of binding the parts more firmly together than is the case with wood pallets or types heretofore commonly employed.

Still another object is to provide a pallet that is resistant to damage by impacts from lift forks.

Some of the forms which my invention may take are shown in the accompanying drawings wherein:

FIGURE 1 is a perspective view of a pallet constructed according to my invention and employing metallic rod or wire binding members.

FIG. 2 is an enlarged vertical sectional view through the structure of FIG. 1.

FIG. 3 is an enlarged elevational view at the end of one of the stringers of FIG. 1.

FIG. 4 shows a manner in which binding rods or wires, together with their connecting dowels may be partly preassembled, preliminary to welding the dowels to the bottom binder of FIG. 2.

FIG. 5 shows a modification of the structure of FIGS. 1 and 2.

FIG. 6 is a schematic view showing a manner in which the dowel members of FIGS. 5 and 7 may be welded together.

FIG. 7 is a fragmentary view showing two of the dowel members of FIGS. 5 and 6 before welding them together.

Figure 8:
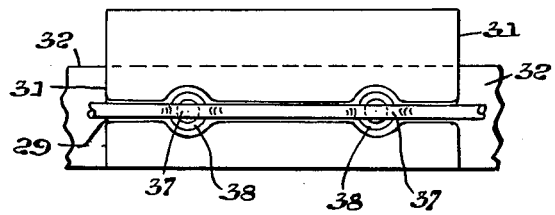
FIG. 8 is a plan view of a portion of the structure of FIG. 5.

Referring first to FIGS. 1 to 4, the structure comprises three stringers 12 suitably of wood, but which may be in any desired number, according to the size of pallet desired. Bottom boards 13 and 14 are secured to the lower edges of the stringers 12 in a manner to be hereinafter explained. Deck boards or slats 15 are likewise secured to the tops of the stringers.

The connections between the members 12, 13, 14 and 15 comprise upper binder rods or wires 16 and their connecting dowels 18 which are welded to the upper binders 16 and then inserted into holes that are previously drilled through the deck boards, the stringers and the bottom boards, so that the lower ends of the dowels may be welded to the bottom binders 17 and electrodes applied to the upper and lower binding rods 16 and 17 in a manner somewhat similar to that shown in FIG. 6, wherein the dowels are, however, of initially divided form as will be hereinafter discussed. The binders may suitably be of 5-gauge wire and the dowels of 3-gauge wire. The holes above referred to will, of course, be in rows coinciding with the alinement of the dowels 18 in the upper binder. This facilitates the assembly of the parts and the welding of the dowels to the lower binders. The dowels could, of course, be initially welded at their lower ends to the binders 17 and the stringers and deck boards, then placed on the binders previous to application of the upper binder 16 and welding thereof to the dowels. The deck boards and the bottom boards will previously be grooved somewhat to provide seats for the binders 16 and 17 and so that they will not project an undue distance above the deck.

The ends of the binders 16 are bent downwardly at 20 and the ends of the binders 17 bent upwardly as at 21. These bent-up ends being welded together, at the ends of the stringers 12, not only to afford substantial protection against damage to the edges of the adjacent deck boards and to the ends of the stringers through impacts with the forks of fork-lift trucks, but also to tie down the ends of the binders and thus offer greater resistance to lifting forces at the undersides of the endmost deck boards.

As shown more clearly in FIG. 2, clear spaces are provided between the deckboards 13 and 14, as shown at 23, to render the pallet particularly suitable for use with lift fork trucks which have rollers on the ends of their lifting arms. That is to say, when the lift forks are inserted into the spaces between the stringers in directions parallel to such stringers, the supporting rollers on the fork arms can be lowered into the areas at 23 and thus have direct support on the floor. Trucks having means for transferring the load from the upper surfaces of the lifting arms to the rollers are well known in the art. The deflected portions 23 of the binders 17 protect the stringers from wear by lift forks.

The areas at 23 also allow sidewise entry of lift forks of thin vertical section, making a four-way pallet. The bent-up portions of the binders at 23, serve not only to protect the stringers from abrasion of lifting forks which enter from the side of the pallet, but also serve as anchoring members for the dowels at those points and the upper binders.

Referring now to FIGS. 5, 6, 7 and 8, I show an arrangement wherein the lower binders 25 and 26 are made in sections and have welded thereto the lower ends of dowel members 27 and 28 respectively. The upper binders 29 are shown as continuous and have welded thereto the upper dowel members 30. The deck boards 31, the stringers 32 and the bottom boards 33 are preliminarily drilled for the reception of the dowels 27—28—30. The lower ends of the upper dowels 30 are of beveled or chisel shape and the upper ends of the dowels 27—28 have recesses to receive these chisel points as shown in FIG. 6. When the dowels are brought together as shown in FIG. 6 and electric current supplied thereto through electrodes 35 and 36, the welds will be effected, thus binding the parts firmly together, without the use of nails or bolts.

In order to compensate for shrinkage of the wood, in case it may be damp wood or green lumber, in FIG. 5, I make the overall length of the dowels 28—30 shorter than the average distance between the upper binders and the lower binders and to this end, deflect portions of the upper binders downwardly at 37 into countersunk areas 38 in the deck boards previous to or during the application of welding current. By this arrangement, danger of upward bulging of the binders 29 upon shrinkage of the stringers 32 is avoided. A takeup for shrinkage may be provided for by bending the binders 29 downwardly as indicated at 29a in FIG. 5, whenever shrinkage may occur in the stringers after long use. Similarly vertical shrinkage can be compensated for by bending the vertical ends of the binders into recesses in the ends of the stringers as indicated at 39 in FIG. 9.

The appication of the welding current to the dowels will of course be of short duration—perhaps not more than 1/5 of a second—and automatically controlled by timing devices such as shown in the Reed Patent No. 1,932,119, or Glantzer Pat. 2,814,713. During this short period of time, the wood will not become charred to an appreciable degree. The fact that the electrodes 35 are of like polarity as are also the electrodes 36, avoids short circuiting at those points in the binders, and insures that the current will flow directly through to the oppositely-disposed electrodes.

Figure 9:
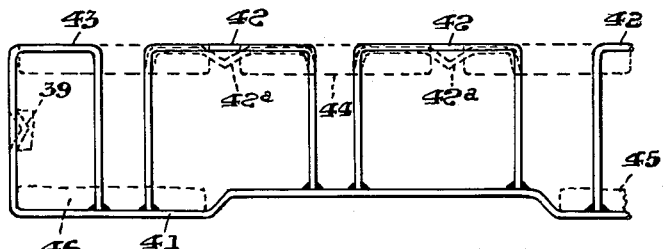
FIG. 9 shows still another modification of the structure of FIG. 2.
Figure 10:
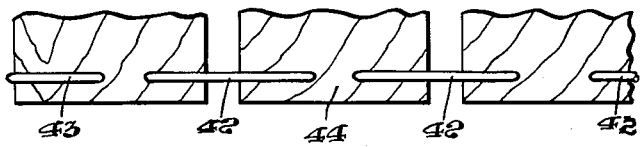
FIG. 10 shows a fragmentary plan view thereof.

Referring further to FIG. 9 and to FIG. 10, I show an arrangement wherein the lower binders 41 are continuous and the upper binders comprise yokes 42 and 43 whose leg portions extend through holes in the deck boards 44, the stringers 45 and the bottom boards 46. Only about one-half the pallet is shown in FIG. 9. The binders 42, except at the end boards of the pallet, each extends through two deck boards, adjacent binders also extending through these deck boards, thus tying the parts firmly together. Here too, provision is made for taking up shrinkage by bending the upper binders down as at 42a.

Figure 11:
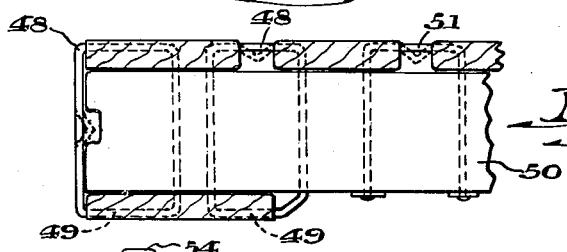
FIGS. 11 and 12 show still other modifications.

In FIGURE 11, I show still another manner of fastening the deck boards, stringers and bottom boards together. In this form, the binders 48 have legs that extend through the wood members, but have their lower ends bent at 49, their extremities being preferably welded together. The extremities of these legs are pointed, so they can be driven into place, after the manner of staples, though usually the stringers 50 will have to be predrilled.

Where some bottom boards are omitted as in FIG. 2, a modified form of binder will be used, as shown at 51. At their lower ends, the binders 51 will extend through retaining members such as washers 52 and riveted over or welded thereto.

Figure 12:
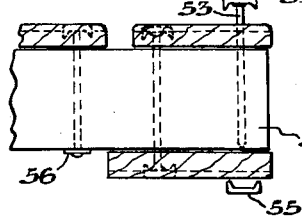

In FIG. 12, I show dowels 53 that have heads 54 welded or otherwise formed thereon and pointed at their lower ends, for riveting or welding to washers 55 and 56. In this case, as in FIG. 11, the top and bottom boards do not need to be predrilled.

I claim as my invention:

1. A pallet structure that comprises a deck and a bottom, each comprising laterally-spaced slats having rows of holes, stringer members disposed between the deck and the bottom and each having holes therethrough, in vertical alinement with adjacent rows of vertical holes through the deck and bottom, the bottom slats being spaced apart at areas intermediate the ends of the stringers, to provide spaces for the entry of lift forks beneath the stringers, a narrow binder of fusible material disposed along the lower ends of each row of holes in the bottom slats and against holes in the stringers at said areas, a narrow binder of fusible material on the deck and disposed along the upper ends of each row of holes in the deck slats, and connector dowels extending through the various holes in the stringers, the deck and the bottom slats and welded at their respective ends to the adjacent upper and lower binders, to thereby hold the binders against the deck and bottom slats and against the undersides of the stringers at said areas.

2. A pallet as recited in claim 1, wherein the slats of the deck and bottom are spaced apart in a common plane and each of the binders is continuous and is bendable inwardly to set positions between the slats that it crosses.

3. A pallet structure as recited in claim 1, wherein the upper and lower binder elements are bent vertically, against the ends of the stringers for substantial distances, and are welded together at said ends.

4. A structure as recited in claim 1, wherein each dowel is in two parts one of which is welded to the upper binder and the other to the lower binder, the two parts of the dowel being welded together adjacent to the mid plane of the pallet.

References Cited in the file of this patent

UNITED STATES PATENTS

| | | |
|---|---|---|
| 325,969 | Redding | Sept. 8, 1885 |
| 1,077,834 | Justen | Nov. 4, 1913 |
| 2,448,447 | Lau | Aug. 31, 1948 |
| 2,651,486 | Woodward | Sept. 8, 1953 |
| 2,798,284 | Mudd | July 9, 1957 |
| 2,844,864 | Schilberg | July 29, 1958 |
| 2,931,610 | Trent | Apr. 5, 1960 |
| 2,942,825 | Trapp | June 28, 1960 |

FOREIGN PATENTS

| | | |
|---|---|---|
| 144,853 | Sweden | Apr. 6, 1954 |
| 147,838 | Sweden | Nov. 23, 1954 |